United States Patent
Ettireddy et al.

(10) Patent No.: US 9,702,291 B2
(45) Date of Patent: Jul. 11, 2017

(54) EXHAUST AFTERTREATMENT SYSTEM WITH AMMONIA GAS GENERATOR

(71) Applicant: Tenneco Automotive Operating Company Inc., Lake Forest, IL (US)

(72) Inventors: Padmanabha R. Ettireddy, Canton, MI (US); Bradley Fingland, Jackson, MI (US); Adam J. Kotrba, Laingsburg, MI (US); John W. Degeorge, Michigan Center, MI (US); Michael C. Bradford, Chelsea, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/931,039

(22) Filed: Nov. 3, 2015

(65) Prior Publication Data

US 2017/0122169 A1    May 4, 2017

(51) Int. Cl.
*B01D 53/94* (2006.01)
*F01N 3/035* (2006.01)
(Continued)

(52) U.S. Cl.
CPC ....... *F01N 3/2013* (2013.01); *B01D 53/9431* (2013.01); *F01N 3/021* (2013.01);
(Continued)

(58) Field of Classification Search
CPC .. F01N 2610/03; F01N 2610/02; F01N 3/208; F01N 3/206; F01N 3/2066;
(Continued)

(56) References Cited

U.S. PATENT DOCUMENTS 5,272,871 A    12/1993 Oshima et al.
5,809,775 A *  9/1998 Tarabulski ............. B01D 53/90
                                                    423/212
(Continued)

FOREIGN PATENT DOCUMENTS

DE         4221363 A1    1/1993
DE        19947198 A1    4/2001
(Continued)

OTHER PUBLICATIONS

C.W. Park et al. "Effect of hydrogen-enriched gas as a reductant on the performance of a lean NOx trap catalyst for a light-duty diesel engine"; May 28, 2010.

*Primary Examiner* — Timothy Vanoy
(74) *Attorney, Agent, or Firm* — Harness, Dickey & Pierce, P.L.C.

(57) ABSTRACT

An exhaust aftertreatment system may include a reductant tank, a reactor system, a storage tank, a first conduit and a second conduit. The reactor system may receive reductant from the reductant tank and may output a gas comprising ammonia. The storage tank may receive gas comprising ammonia from the reactor system and may store a volume of gas comprising ammonia. The first conduit may communicate gas comprising ammonia from the reactor system to a stream of exhaust gas. The first conduit may bypass the storage tank. The second conduit may communicate gas comprising ammonia from the storage tank to the stream of exhaust gas.

38 Claims, 5 Drawing Sheets

(51) Int. Cl.
  *F01N 3/10* (2006.01)
  *F01N 3/20* (2006.01)
  *F01N 13/00* (2010.01)
  *F01N 3/021* (2006.01)

(52) U.S. Cl.
  CPC ............ *F01N 3/206* (2013.01); *F01N 3/2066* (2013.01); *F01N 13/009* (2014.06); *B01D 2251/2062* (2013.01); *F01N 2240/02* (2013.01); *F01N 2240/10* (2013.01); *F01N 2240/25* (2013.01); *F01N 2250/02* (2013.01); *F01N 2610/02* (2013.01)

(58) Field of Classification Search
  CPC .......... F01N 3/103; F01N 3/101; F01N 3/035; B01D 53/9445; B01D 53/944; B01D 53/9418
  See application file for complete search history.

(56) References Cited

U.S. PATENT DOCUMENTS

| | | | |
|---|---|---|---|
| 7,157,166 B2 | 1/2007 | Vajo | |
| 7,204,081 B2* | 4/2007 | Yasui | F01N 3/2066 60/274 |
| 7,418,957 B2 | 9/2008 | Abe | |
| 7,803,264 B2 | 9/2010 | Botte | |
| 7,954,311 B2* | 6/2011 | Shaikh | F01N 3/2066 60/266 |
| 8,069,827 B2 | 12/2011 | Watanabe et al. | |
| 8,166,926 B2 | 5/2012 | Sasaki et al. | |
| 8,388,920 B2 | 3/2013 | Botte | |
| 8,491,842 B2* | 7/2013 | Johansen | C01C 1/006 206/0.7 |
| 8,562,929 B2 | 10/2013 | Botte | |
| 8,740,113 B2 | 6/2014 | Roessle et al. | |
| 8,911,699 B2 | 12/2014 | Colannino et al. | |
| 8,978,364 B2 | 3/2015 | Olivier et al. | |
| 9,057,304 B2 | 6/2015 | Huthwohl | |
| 9,217,347 B2 | 12/2015 | Englert et al. | |
| 2009/0095636 A1 | 4/2009 | Botte | |
| 2010/0018476 A1 | 1/2010 | Zemskova et al. | |
| 2010/0114463 A1 | 5/2010 | Leustek et al. | |
| 2010/0319317 A1 | 12/2010 | Oberski et al. | |
| 2011/0243823 A1 | 10/2011 | Botte | |
| 2011/0302909 A1 | 12/2011 | Botte | |
| 2013/0000729 A1 | 1/2013 | Mokire et al. | |
| 2013/0064744 A1 | 3/2013 | Yacoub | |
| 2013/0115141 A1 | 5/2013 | Han et al. | |
| 2014/0070031 A1 | 3/2014 | Lowry et al. | |
| 2015/0064086 A1 | 3/2015 | Colannino et al. | |

FOREIGN PATENT DOCUMENTS

| | | |
|---|---|---|
| DE | 10047512 A1 | 8/2002 |
| DE | 10359522 A1 | 7/2005 |
| DE | 102014001879 A1 | 8/2015 |
| DE | 102014001880 A1 | 8/2015 |
| DE | 102014019427 A1 | 8/2015 |
| EP | 946254 A1 | 10/1999 |
| EP | 1355721 B1 | 10/2003 |
| EP | 1435458 A1 | 7/2004 |
| EP | 2411636 A1 | 2/2012 |
| EP | 02652279 B1 | 10/2013 |
| EP | 02871340 A1 | 5/2015 |
| KR | 2011-0083944 A | 7/2011 |
| WO | WO-2014070516 A1 | 5/2014 |

\* cited by examiner

EXHAUST AFTERTREATMENT SYSTEM WITH AMMONIA GAS GENERATOR

FIELD

The present disclosure relates to an exhaust aftertreatment system with an ammonia gas generator.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC). Typical SCR systems include a reductant delivery system for injecting a reductant (e.g., urea) upstream of an SCR catalyst.

More recently, reactors have been provided to generate ammonia gas from liquid reductant. Compared to liquid urea, gaseous ammonia is more reactive, more easily dispersed uniformly in the exhaust stream, and is more active over a wider temperature range. Therefore, the use of ammonia gas in an SCR system can improve the efficiency and effectiveness of the SCR system.

Reactors for generating ammonia gas are most effective when operating within a particular temperature range. Therefore, generation of ammonia gas may be delayed and/or hindered after a cold start of an engine. Accordingly, it may be desirable to provide an aftertreatment system that can effectively provide ammonia gas to an SCR catalyst immediately following a cold start of an engine.

SUMMARY

This section provides a general summary of the disclosure, and is not a comprehensive disclosure of its full scope or all of its features.

In one form, the present disclosure provides, an exhaust aftertreatment system that may include a reductant tank, a reactor system, a storage tank, a first conduit and a second conduit. The reactor system may receive reductant from the reductant tank and may output gas comprising ammonia (i.e., a gas comprising ammonia). The storage tank may receive gas comprising ammonia from the reactor system and may store a volume of gas comprising ammonia. The first conduit may communicate gas comprising ammonia from the reactor system to a stream of exhaust gas. The first conduit may bypass the storage tank. The second conduit may communicate gas comprising ammonia from the storage tank to the stream of exhaust gas.

In some configurations, the reactor system could be an electrolysis reactor system, for example.

In some configurations, the first and second conduits are fluidly coupled with an exhaust pipe at a location (e.g., an injector, nozzle, orifice, etc.) upstream of a catalyst in the stream of exhaust gas.

In some configurations, the catalyst is a selective catalytic reduction catalyst.

In some configurations, the exhaust aftertreatment system includes a particulate filter and an oxidation catalyst. The particulate filter may be disposed upstream of the location and the selective catalytic reduction catalyst. The oxidation catalyst may be disposed upstream of the particulate filter.

In some configurations, the exhaust aftertreatment system includes a first heat exchanger in a heat transfer relationship with the reactor system. The first heat exchanger may transfer heat from exhaust gas to the reactor system.

In some configurations, the exhaust aftertreatment system includes an exhaust supply passageway fluidly coupling the stream of exhaust gas and the first heat exchanger so that exhaust gas from the stream of exhaust gas can flow through the first heat exchanger.

In some configurations, the exhaust supply passageway includes a valve controlling fluid flow therethrough.

In some configurations, the exhaust aftertreatment system also includes an exhaust return passageway fluidly coupling the stream of exhaust gas and the first heat exchanger. The exhaust supply and return passageways may be connected to the stream of exhaust gas upstream of a catalyst in the stream of exhaust gas.

In some configurations, the exhaust aftertreatment system includes an electrical heating element in a heat transfer relationship with the reactor system.

In some configurations, the exhaust aftertreatment system includes a second heat exchanger in which heat is transferred from the stream of exhaust gas to a working fluid. The first and second heat exchangers may be fluidly coupled to each other to allow a first flow of the working fluid therebetween.

In some configurations, the second heat exchanger is fluidly coupled to an engine to allow a second flow of the working fluid therebetween.

In some configurations, the exhaust aftertreatment system includes a valve controlling the first and second flows of the working fluid.

In some configurations, the exhaust aftertreatment system includes a Rankine cycle fluid circuit transferring heat from exhaust gas to working fluid. The first heat exchanger may receive the working fluid and transfer heat from the working fluid to the reactor system.

In some configurations, the exhaust aftertreatment system includes a first heat exchanger in a heat transfer relationship with the reactor system. The first heat exchanger may be fluidly coupled with an engine to allow communication of a working fluid therebetween. The first heat exchanger may transfer heat from the working fluid to the reactor system.

In some configurations, the exhaust aftertreatment system includes a second heat exchanger in a heat transfer relationship with the reductant tank, the second heat exchanger transferring heat from exhaust gas to the reductant tank; and a valve controlling flows of a heat transfer medium through the first and second heat exchangers.

In some configurations, the reactor system includes an electrolysis reactor unit and a separation unit (e.g., separating water or electrolyte) disposed downstream of the electrolysis reactor unit.

In some configurations, the exhaust aftertreatment system includes a heat exchanger in a heat transfer relationship with the electrolysis reactor unit and another heat exchanger in a heat transfer relationship with the water separator. The heat exchangers may transfer heat from exhaust gas to the electrolysis reactor unit and water separator.

In another form, the present disclosure provides an exhaust aftertreatment system that may include a reductant tank, a reactor system, a conduit, a first heat exchanger, a second heat exchanger and a valve. The reactor system may receive reductant from the reductant tank and output gas comprising ammonia. The conduit may communicate gas comprising ammonia from the reactor system to a stream of exhaust gas. The first heat exchanger may be in a heat transfer relationship with the reactor system. The first heat exchanger may transfer heat from exhaust gas to the reactor system. The second heat exchanger may be in a heat transfer relationship with the reductant tank. The second heat exchanger may transfer heat from exhaust gas to the reductant tank. The valve may control flows of a heat transfer medium through the first and second heat exchangers.

In some configurations, the exhaust aftertreatment system includes a storage tank receiving gas comprising ammonia from the reactor system and storing a volume of gas comprising ammonia; a first conduit communicating gas comprising ammonia from the reactor system to a stream of exhaust gas, the first conduit bypassing the storage tank; and a second conduit communicating gas comprising ammonia from the storage tank to the stream of exhaust gas, the first and second conduits fluidly coupled with an injector mounted upstream of a catalyst in the stream of exhaust gas.

In some configurations, the exhaust aftertreatment system includes an exhaust gas passageway fluidly coupling the stream of exhaust gas with the first and second heat exchangers so that exhaust gas from the stream of exhaust gas can flow through the first and second heat exchangers.

In some configurations, the exhaust aftertreatment system includes a third heat exchanger in which heat is transferred from the stream of exhaust gas to a working fluid. The first and second heat exchangers may be fluidly coupled to the third heat exchanger to allow the working fluid to flow between the first and third heat exchangers and between the second and third heat exchangers.

In some configurations, the third heat exchanger is fluidly coupled to an engine to allow the working fluid to flow therebetween.

In some configurations, the exhaust aftertreatment system includes an electrical heating element in a heat transfer relationship with the reactor system.

In another form, the present disclosure provides a method for treating exhaust gas discharged from a combustion engine. The method may include generating gas comprising ammonia from a reductant; storing a first portion of the gas comprising ammonia in a container; injecting a second portion of the gas comprising ammonia into a stream of exhaust gas, the second portion of the gas comprising ammonia being fluidly isolated from the container; and injecting gas comprising ammonia from the container into the stream of exhaust gas in response to a cold start of the combustion engine.

In some configurations, the second portion of the gas comprising ammonia is injected into the stream of exhaust gas through an opening (e.g., an injector, nozzle, orifice, etc.), and gas comprising ammonia from the container is injected into the stream of exhaust gas through the same opening.

In some configurations, the method includes transferring heat from exhaust gas to a reactor system that generates the gas comprising ammonia.

In some configurations, the method includes providing a first heat exchanger in a heat transfer relationship with the reactor system; and providing a Rankine cycle fluid circuit transferring heat from exhaust gas to working fluid. The first heat exchanger may receive the working fluid and transfer heat from the working fluid to the reactor system.

In some configurations, the method includes providing a first heat exchanger in a heat transfer relationship with the reactor system. The first heat exchanger may be fluidly coupled with the combustion engine to allow communication of a working fluid therebetween. The first heat exchanger may transfer heat from the working fluid to the reactor system.

In some configurations, the method includes providing a first heat exchanger in a heat transfer relationship with the reactor system. Transferring heat from exhaust gas to a reactor system may include routing exhaust gas through the first heat exchanger.

In some configurations, transferring heat from the exhaust gas to the reactor system includes transferring heat from the exhaust gas to a working fluid and subsequently transferring heat from the working fluid to the reactor system.

In some configurations, the method includes providing a first heat exchanger in a heat transfer relationship with the reactor system; and providing a second heat exchanger in which heat is transferred from the stream of exhaust gas to the working fluid. The first and second heat exchangers are fluidly coupled to each other to allow a first flow of the working fluid therebetween.

In some configurations, the second heat exchanger is fluidly coupled to the combustion engine to allow a second flow of the working fluid therebetween.

In some configurations, the method includes controlling the first and second flows of the working fluid based on operating parameters of the combustion engine.

In some configurations, the method includes heating the reactor system with an electrical heating element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
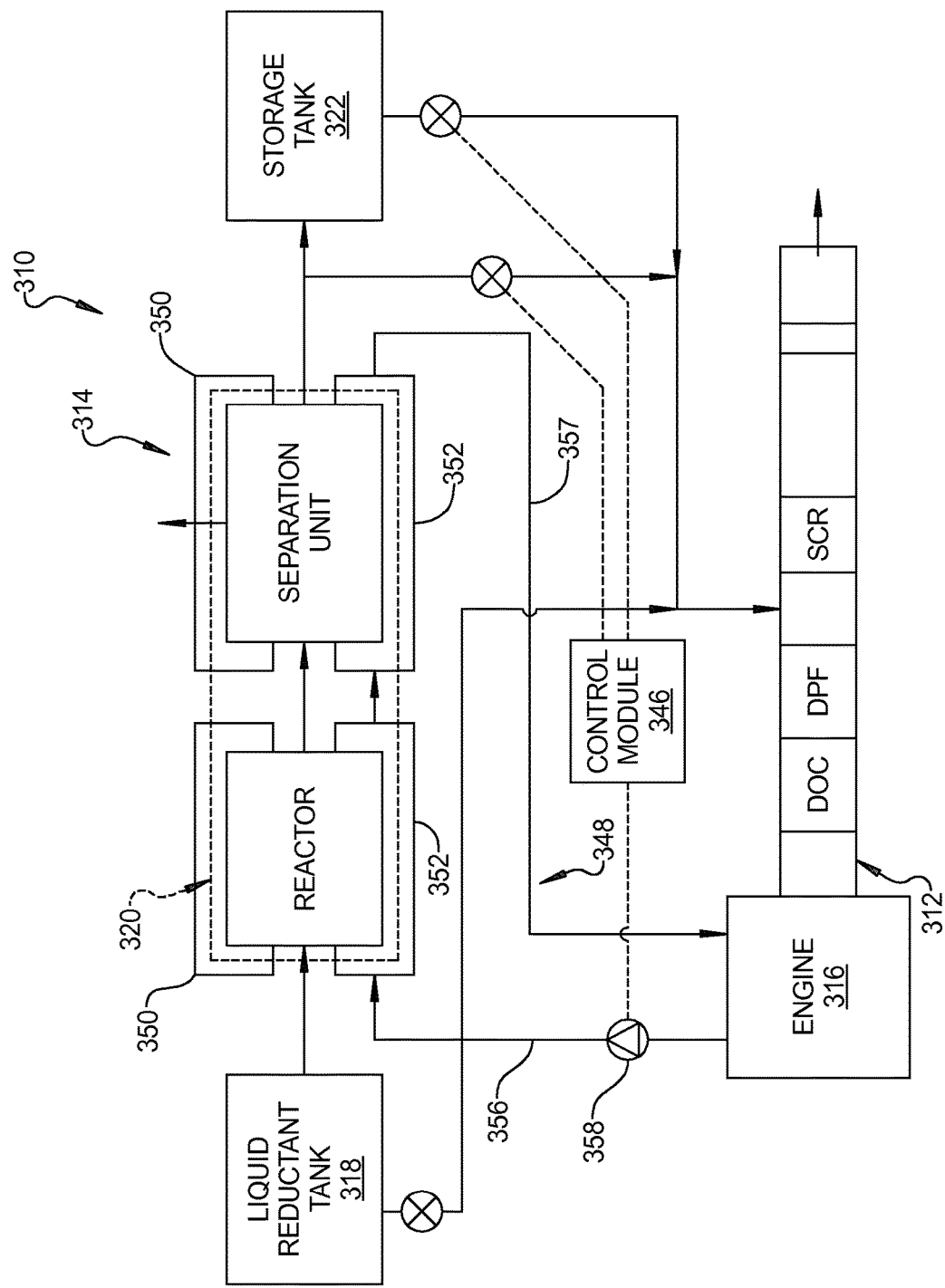
Figure 5:
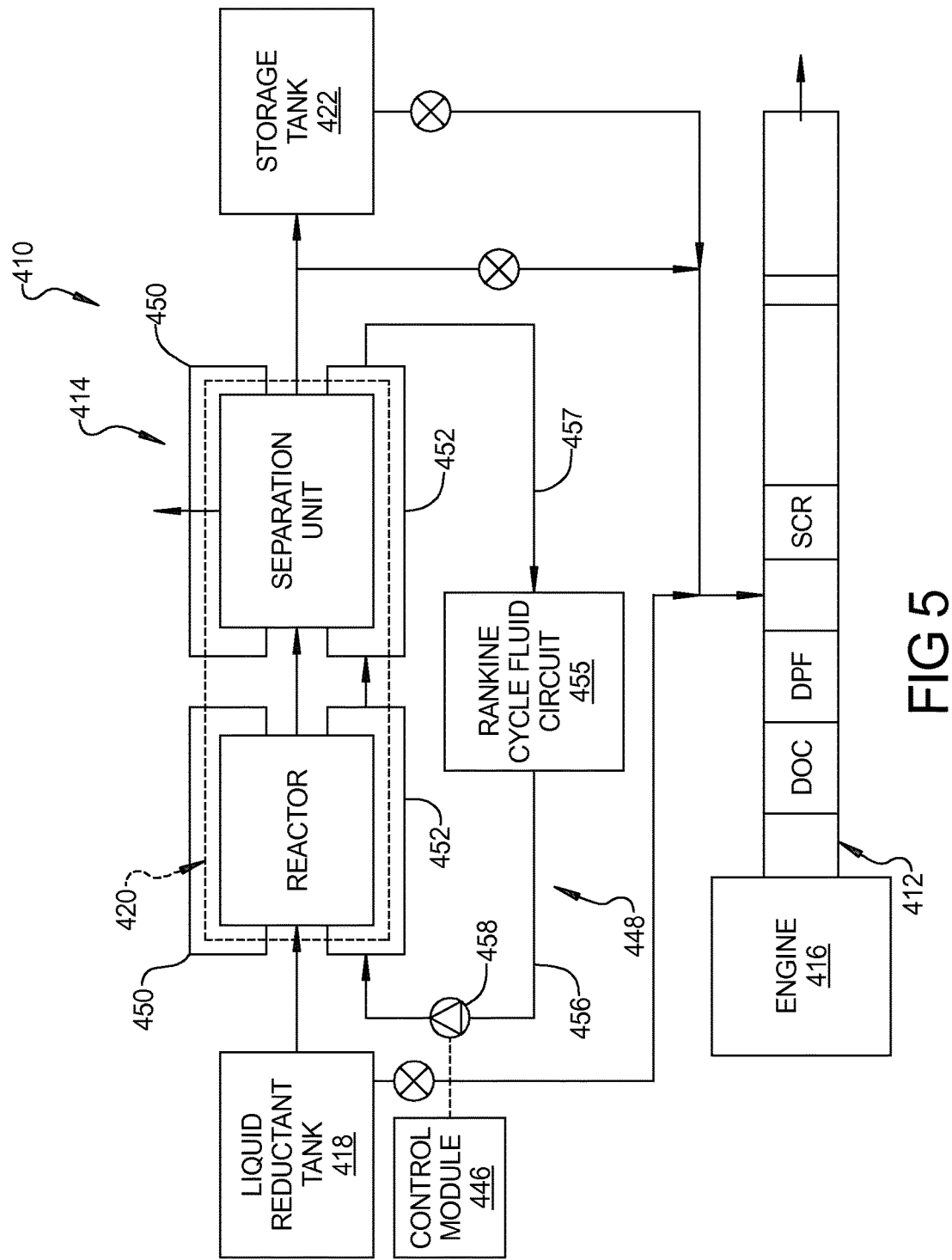

FIG. 4 is a schematic representation of yet another exhaust aftertreatment system including an electrolysis reactor system and gaseous ammonia storage tank according to the principles of the present disclosure; and FIG. 5 is a schematic representation of yet another exhaust aftertreatment system including an electrolysis reactor system and gaseous ammonia storage tank according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
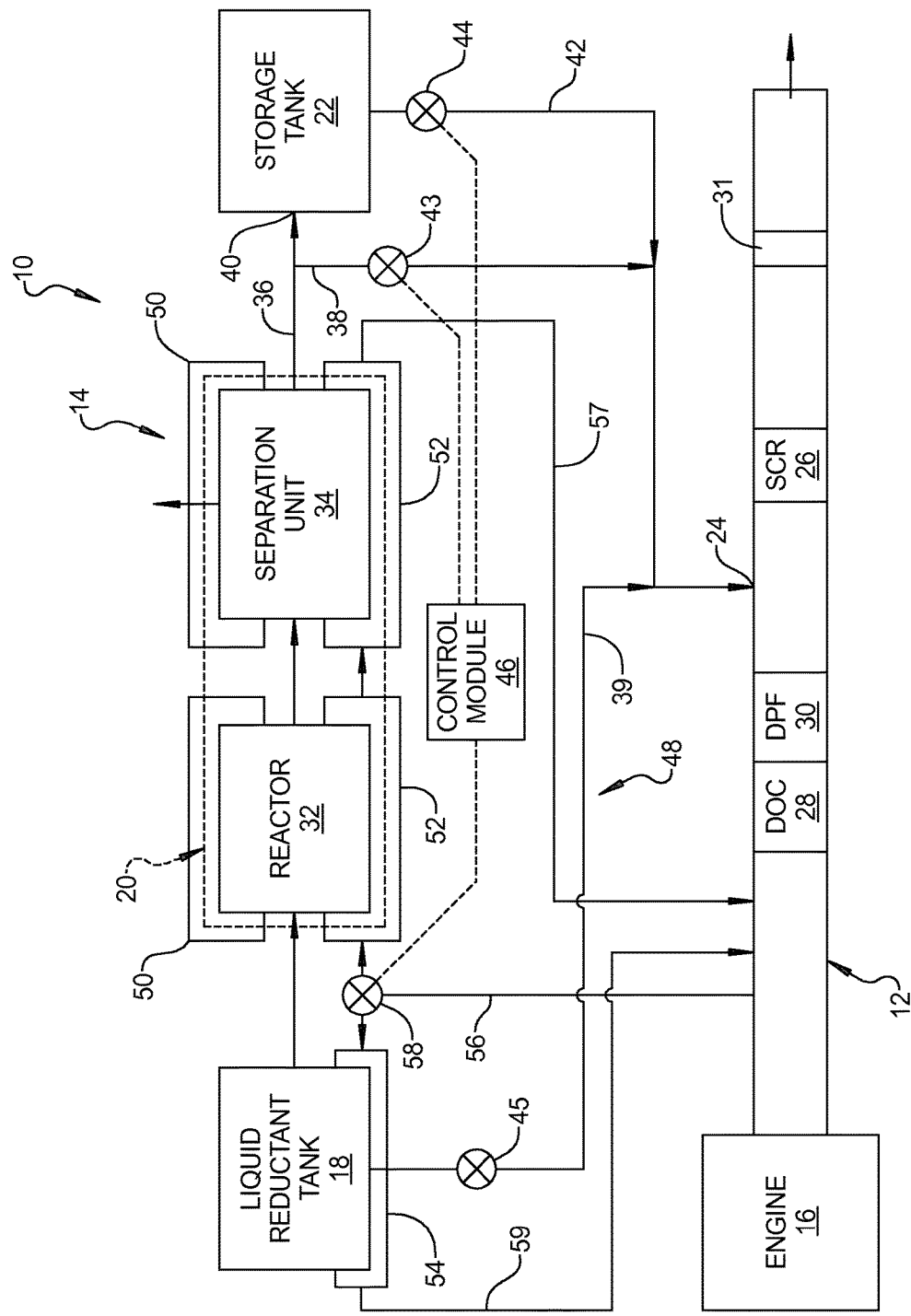
FIG. 1 is a schematic representation of an exhaust aftertreatment system including an electrolysis reactor system and gaseous ammonia storage tank according to the principles of the present disclosure.

With reference to FIG. 1, an exhaust aftertreatment system 10 is provided that may include an exhaust pipe 12 and an SCR system 14. A stream of exhaust gas from a combustion engine 16 may flow through the exhaust pipe 12. For example, the engine 16, exhaust pipe 12 and SCR system 14 can be installed on a vehicle (not shown). The SCR system 14 may include a reductant tank 18, a reactor system 20, a storage tank 22, an injector 24 and an SCR catalyst 26. A gas comprising ammonia generated by the reactor system 20 may be injected into the stream of exhaust gas in the exhaust pipe 12 through the injector 24 upstream of the SCR catalyst 26, which is housed within the exhaust pipe 12. In some configurations, the exhaust aftertreatment system 10 may also include an oxidation catalyst 28 and a particulate filter 30 disposed within the exhaust pipe 12 upstream of the injector 24. It will be appreciated that the injector 24 could be replaced with a nozzle, orifice or any other opening to the exhaust stream within the exhaust pipe 12. An ammonia slip catalyst 31 can be disposed downstream of the SCR catalyst 26. In some configurations, the particulate filter 30 may be an SCR coated diesel particulate filter, and the injector 24 could be disposed between the oxidation catalyst 28 and the filter 30.

The reactor system 20 can include a reactor unit 32 and a separation unit 34. For example, the reactor system 20 can be or include an electrolysis reactor similar or identical to the SCR GreenBox™ provided by E3 Clean Technologies. The separation unit 34 could separate water or electrolyte. Separated electrolyte may be recycled back to the reactor 32. Separated water could be routed through outlet 36, released to the atmosphere, or injected into the engine 16. The separation unit 34 could include a plurality of separators that separate gas/gas or gas/liquid. The separation unit 34 could be remove water from ammonia, electrolyte removed and/or recycled to the reactor, $CO_2/NH_3$ separation, and/or purify $NH_3$.

The reactor system 20 may receive reductant (e.g., a liquid comprising urea) from the reductant tank 18 and output a gas comprising ammonia (as well as gaseous carbon dioxide, carbon monoxide, hydrogen, etc.) through an outlet 36. The outlet 36 is fluidly coupled to a first conduit 38 and to an inlet 40 of the storage tank 22. The first conduit 38 is fluidly coupled to the injector 24 so that at least a portion of the gas comprising ammonia output from the reactor system 20 can be injected into the stream of exhaust gas upstream of the SCR catalyst 26 in the exhaust pipe 12. A control valve 43 may control fluid flow through the first conduit 38.

Another portion of the gas output from the reactor system 20 can be flow into the storage tank 22 through the inlet 40. The storage tank 22 may store a volume of gas comprising ammonia that can be supplied to the injector 24 via a second conduit 42 when desired. The second conduit 42 may include a first control valve 44 that controls the flow of gas comprising ammonia through the second conduit 42. In some configurations, a pump (not shown) may be provided to pump fluid from the storage tank 22 to the injector 24. The first control valve 44 may be in communication with a control module 46 that opens and closes the first control valve 44 based on operating parameters of the engine 16, operating parameters of the reactor system 20 and/or a flow rate of gas comprising ammonia exiting the reactor system 20 through the outlet 36, for example. The control module 46 may open the first control valve 44 to allow a flow of gas comprising ammonia from the storage tank 22 to the injector 24 in response to a cold start of the engine 16. In this manner, the gas comprising ammonia from the storage tank 22 can be immediately available to be injected into the exhaust stream immediately following the cold start. This is advantageous because gas comprising ammonia generation in the reactor system 20 may be hindered or prevented at low ambient temperatures when the vehicle in which the aftertreatment system 10 is installed has been off and has been exposed to low temperatures for a prolonged period of time. Once the reactor system 20 is able to generate gas comprising ammonia at a rate that meets demand, the control module 46 may fully or partially close the first control valve 44.

The aftertreatment system 10 may include a heating system 48 operable to heat the reductant tank 18 and/or the reactor system 20 to facilitate efficient production of gas comprising ammonia. The heating system 48 can include one or more electrical heating elements 50 in a heat transfer relationship with the reactor system 20 and/or the reductant tank 18. The control module 46 may control operation of the electrical heating elements 50 to maintain the reactor system 20 and/or reductant tank 18 at or above a desired minimum temperature.

The heating system 48 may also include one or more first heat exchangers 52 in a heat transfer relationship with the reactor system 20 and/or one or more second heat exchangers 54 in a heat transfer relationship with the reductant tank 18. The first and second heat exchangers 52, 54 may be fluidly coupled with the exhaust pipe 12 via an exhaust supply passageway 56. In this manner, heat from the exhaust gas flowing through the first and second heat exchangers 52, 54 can be transferred to the reactor system 20 and the reductant tank 18, respectively. After flowing through the first heat exchanger(s) 52, the exhaust gas may return to the exhaust pipe 12 through a first return passageway 57. Similarly, after flowing through the second heat exchanger 54, the exhaust gas may return to the exhaust pipe 12 through a second return passageway 59. The supply and return passageways 56, 57, 59 may be coupled to the exhaust pipe 12 at any suitable locations, i.e., upstream or downstream of any one or more of the oxidation catalyst 28, the particulate filter 30 and the SCR catalyst 26.

A second control valve 58 may be disposed along the exhaust passageway 56 and may be movable between a plurality of positions to prevent fluid communication between the exhaust pipe 12 and the first and second heat exchangers 52, 54 and to allow fluid communication between the exhaust pipe 12 and one or both of the first and second heat exchangers 52, 54. The control module 46 may be in communication with the second control valve 58 and may control the position of the second control valve 58 to control the flow of exhaust gas through the first and second heat exchangers 52, 54. The control module 46 may control the second control valve 58 based on temperatures of the reactor system 20, the reductant tank 18 and/or fluid within the reactor system 20 or reductant tank 18, for example. Additionally or alternatively, the control module 46 could control the second control valve 58 based on engine temperature, engine runtime and/or outdoor ambient temperature, for example.

With continued reference to FIG. 1, operation of the aftertreatment system 10 will be described in more detail. In response to a cold start of the engine 16, the control module 46 may open the first control valve 44 to allow gas comprising ammonia from the storage tank 22 to be delivered to the exhaust stream in the exhaust pipe 12 through the second conduit 42 and the injector 24. As the reactor system 20 begins to generate gas comprising ammonia following the cold start, that gas comprising ammonia can also be communicated to the injector 24 through the first conduit 38. Once the rate of gas generation by reactor system 20 has increased to a level that at least matches a demand for the gas comprising ammonia, the control module 46 can close the first control valve 44 to stop the flow of gas comprising ammonia through the second conduit 42.

After the cold start of the engine 16, the reactor system 20 may need to be heated to facilitate the reactions therein to generate gas comprising ammonia. Under such circumstances, the control module 46 may move the second control valve 58 to a position that allows exhaust gas from the exhaust pipe 12 to flow from the exhaust supply passageway 56 and through the first heat exchanger(s) 52, thereby heating the reactor system 20. After the reactor system 20 has been sufficiently heated, the control module 46 may cause the second control valve 58 to block the flow of exhaust gas to the first heat exchanger(s) 52 and allow exhaust gas to flow through the second heat exchanger 54 to heat the reductant tank 18. After the reductant tank 18 is sufficiently heated, the control module 46 may cause the second control valve 58 to block the flow of exhaust gas to the second heat exchanger 54. It will be appreciated that the control module 46 could cause the second control valve 58 to move to a position that allows exhaust gas to flow through the first and second heat exchangers 52, 54 simultaneously or individually, as desired. Additionally or alternatively, the control module 46 may activate or deactivate the electrical heating elements 50 at any time, as desired.

It will be appreciated that, in some configurations, the system 14 could include a bypass conduit 39 that directly connects the tank 18 with an injector or orifice upstream of the SCR catalyst 26. A control valve 45 may control fluid flow through the bypass conduit 39 to selectively allow reductant from the tank 18 to bypass the reactor 32 and separation unit 34 and be injected into the exhaust stream upstream of the SCR catalyst 26.

In some configurations, immediately after a cold start, the second control valve 58 may channel some or all of the exhaust gas to the second heat exchanger 54 to first thaw liquid within the tank 18, During this time, reductant from the tank 18 may be injected directly into the exhaust stream (i.e., bypassing the reactor 32 and separation unit 34) through the bypass conduit described above. After warm up, heat is diverted to promote gaseous conversion. After the reductant in the tank 18 is warmed up, the second control valve 54 may allow exhaust gas into the first heat exchangers 52.

In some configurations, the tank 18 may include a pressure-relief valve that can vent the tank 18 in response to the creation of high pressure ammonia in the tank 18 as the tank 18 is heated. Excess ammonia could be vented from the tank 18 to a low-pressure point upstream of the injector 24, for example. In some configurations, the storage tank 22 may include a pressure-relief valve that can vent the storage tank 22 in response to the creation of high pressure ammonia in the storage tank 22. Excess gas comprising ammonia could be vented to a location in the exhaust pipe 12 upstream of the ammonia slip catalyst 31 or to the atmosphere, for example.

Figure 2:
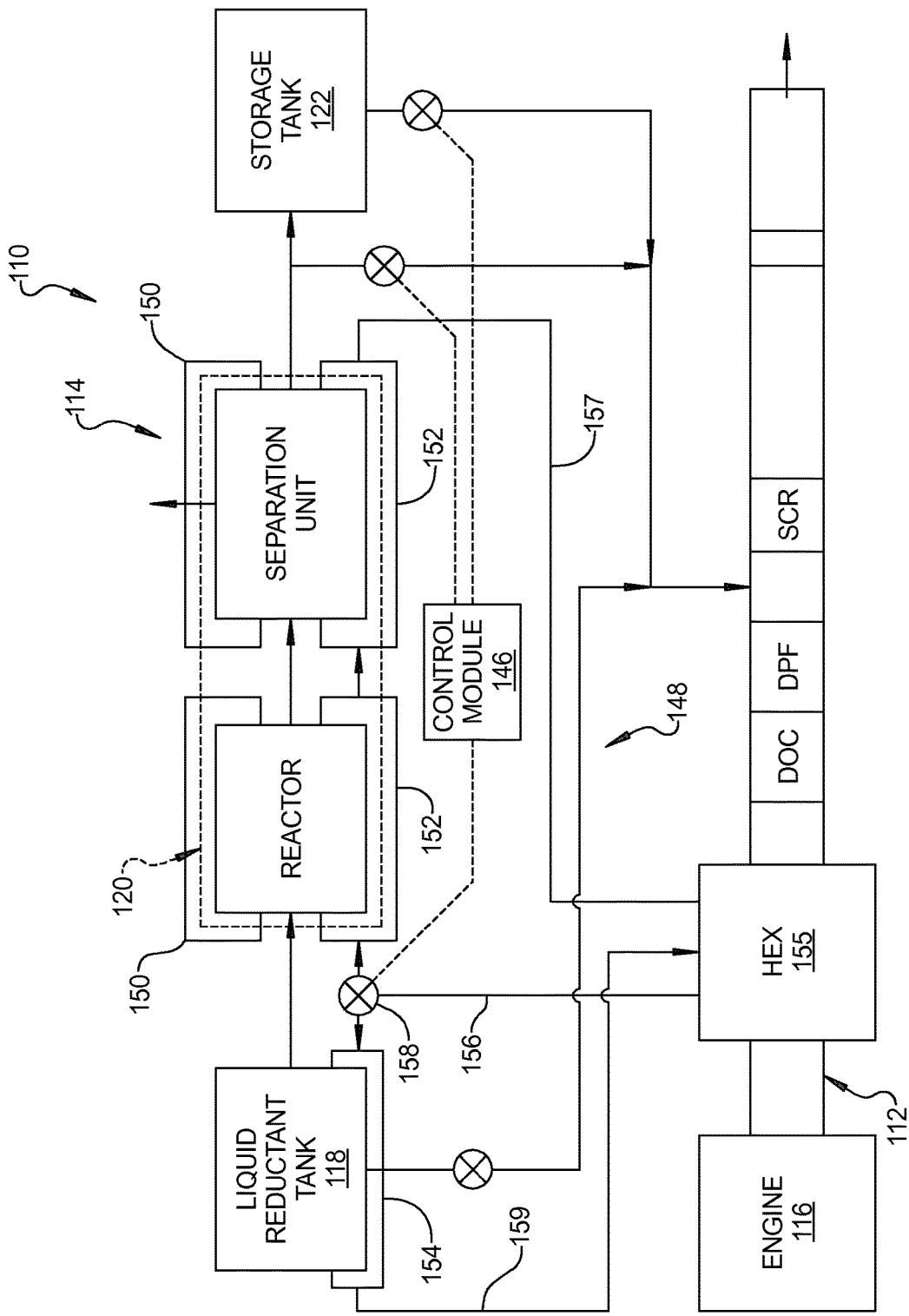
FIG. 2 is a schematic representation of another exhaust aftertreatment system including an electrolysis reactor system and gaseous ammonia storage tank according to the principles of the present disclosure.

With reference to FIG. 2, another exhaust aftertreatment system 110 is provided that may include an exhaust pipe 112, an SCR system 114 and a heating system 148 and may treat exhaust gas discharged from a combustion engine 116. The exhaust pipe 112, SCR system 114 and heating system 148 can be structured and function similarly or identically to the exhaust pipe 12, SCR system 14 and heating system 48, respectively, apart from any exceptions described below. Therefore, similar features will not be described again in detail.

Like the SCR system 14, the SCR system 114 may include a reductant tank 118, a reactor system 120 and a storage tank 122. The SCR system 114 may generate and store gas comprising ammonia and provide gas comprising ammonia to the exhaust stream within the exhaust pipe 112. Like the heating system 48, the heating system 148 may include one or more first heat exchangers 152 in a heat transfer relationship with the reactor system 120 and a second heat exchanger 154 in a heat transfer relationship with the reductant tank 118.

The first and second heat exchangers 152, 154 may be in fluid communication with a third heat exchanger 155. The third heat exchanger 155 may be disposed in or adjacent the exhaust pipe 112 so that a working fluid (e.g., a coolant) flowing through the third head exchanger 155 can absorb heat from exhaust gas flowing through the exhaust pipe 112. A supply passageway 156 and first and second return passageways 157, 159 can fluidly connect the third heat exchanger 155 with the first and second heat exchangers 152, 154 and form a closed loop therebetween. A pump (not shown) can circulate the working fluid among the first, second and third heat exchangers 152, 154, 155.

A control valve 158 may be disposed along the supply passageway 156 and may be movable between a plurality of positions to prevent fluid communication between the third heat exchanger 155 and the first and second heat exchangers 152, 154 and to allow fluid communication between the third heat exchanger 155 and one or both of the first and second heat exchangers 152, 154. A control module 146 may be in communication with the control valve 158 and may control the position of the control valve 158 to control the flow of working fluid through the first and second heat exchangers 152, 154. The control module 146 may control the control valve 158 based on temperatures of the reactor system 120, the reductant tank 118 and/or fluid within the reactor system 120 or reductant tank 118, for example. Additionally or alternatively, the control module 146 could control the control valve 158 based on engine temperature, engine runtime and/or outdoor ambient temperature, for example. Additionally or alternatively, the control module 146 can may activate or deactivate the electrical heating elements 150 at any time to heat the reactor system 120, as desired.

Figure 3:
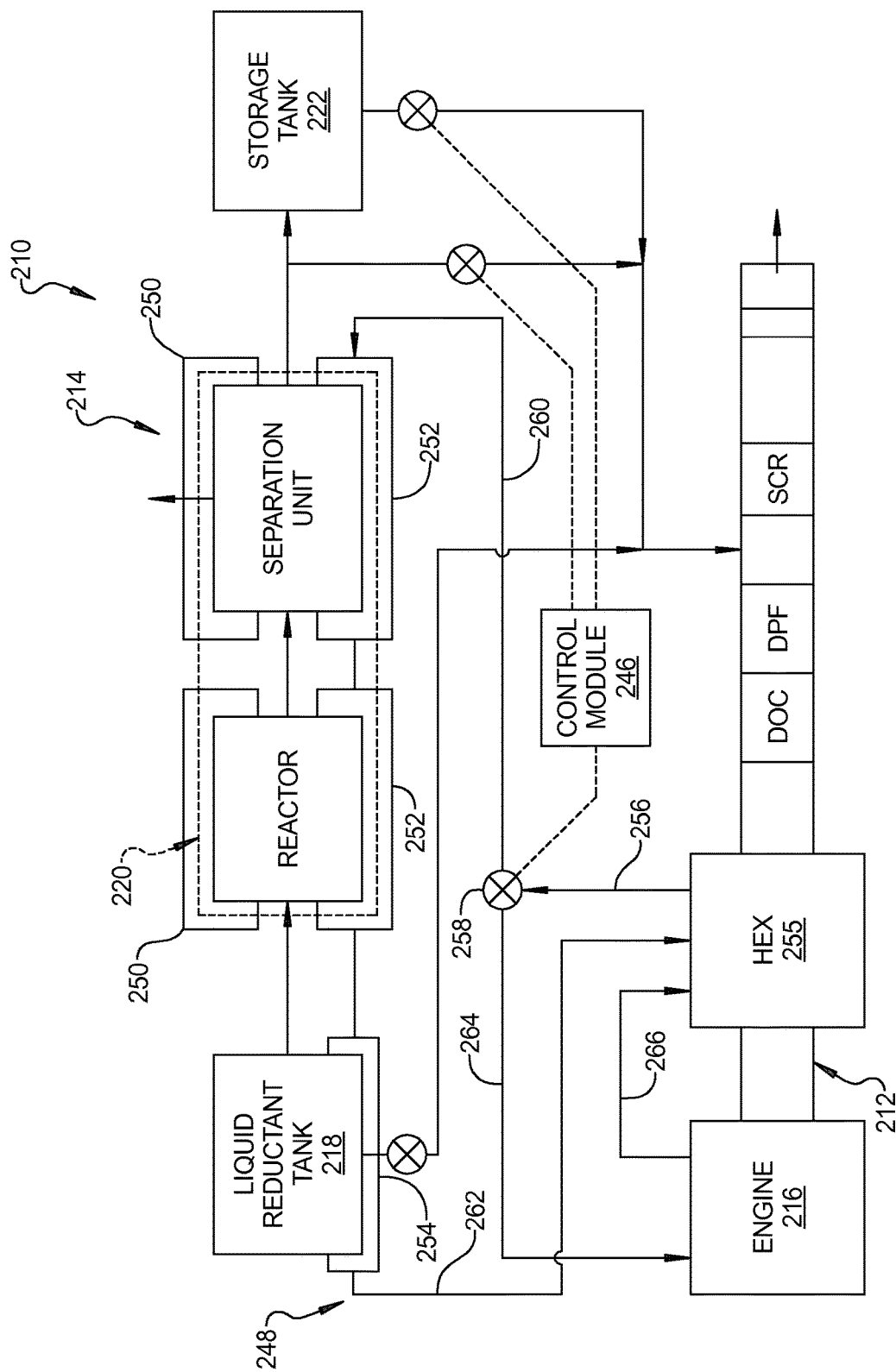
FIG. 3 is a schematic representation of yet another exhaust aftertreatment system including an electrolysis reactor system and gaseous ammonia storage tank according to the principles of the present disclosure.

With reference to FIG. 3, another exhaust aftertreatment system 210 is provided that may include an exhaust pipe 212, an SCR system 214 and a heating system 248 and may treat exhaust gas discharged from a combustion engine 216. The exhaust pipe 212, SCR system 214 and heating system 248 can be structured and function similarly or identically to the exhaust pipe 12, 112, SCR system 14, 114 and heating system 48, 148, respectively, apart from any exceptions described below. Therefore, similar features will not be described again in detail.

Like the SCR system 14, the SCR system 214 may include a reductant tank 218, a reactor system 220 and a storage tank 222. The SCR system 214 may generate and store gas comprising ammonia and provide gas comprising ammonia to the exhaust stream within the exhaust pipe 212. Like the heating systems 48, 148, the heating system 248 may include one or more first heat exchangers 252 in a heat transfer relationship with the reactor system 220 and a second heat exchanger 254 in a heat transfer relationship with the reductant tank 218.

The first and second heat exchangers 252, 254 may be in fluid communication with a third heat exchanger 255. The third heat exchanger 255 may be disposed in or adjacent the exhaust pipe 212 so that a working fluid (e.g., a coolant) flowing through the third head exchanger 255 can absorb heat from exhaust gas flowing through the exhaust pipe 212. The third heat exchanger 255 may also be in fluid communication with coolant passages in the engine 216 so that coolant can warm the engine 216 after a cold start.

A first and second supply passageways 256, 260 and a first return passageways 262 can fluidly connect the third heat exchanger 255 with the first and second heat exchangers 252, 254. The first supply passageway 256, a third supply passageway 264 and a second return passageway 266 may fluidly connect the third heat exchanger 255 with the engine 216. A pump (not shown) can circulate the working fluid among the first, second and third heat exchangers 252, 254, 255 and the engine 216. A bypass conduit and bypass valve may be provided to selectively allow working fluid to bypass the reductant tank 218 if the reductant tank 218 gets too hot. While FIG. 3 depicts the supply passage 260 and the return passage 262 being configured such that the working fluid flows through the reactor system 220 before the tank reductant 218, in some configurations, the passages 260, 262 could be configured such that the working fluid flows to the reductant tank 218 before the reactor system 220.

A control valve 258 may be disposed along the first supply passageway 256 and may be movable between a plurality of positions to control fluid communication between the first, second and third heat exchangers 252, 254, 255 and to control fluid communication between the third heat exchanger 255 and the engine 216. A control module 246 may be in communication with the control valve 258 and may control the position of the control valve 258 to allow and prevent a flow of working fluid through the first and second heat exchangers 152, 154 and/or through the engine 216. The control module 246 may control the control valve 258 based on temperatures of the reactor system 220, the reductant tank 218 and/or fluid within the reactor system 220 or reductant tank 218, for example. Additionally or alternatively, the control module 246 could control the control valve 258 based on engine temperature, engine runtime and/or outdoor ambient temperature, for example. Additionally or alternatively, the control module 246 can may activate or deactivate the electrical heating elements 250 at any time to heat the reactor system 220, as desired.

With reference to FIG. 4, another exhaust aftertreatment system 310 is provided that may include an exhaust pipe 312, an SCR system 314 and a heating system 348 and may treat exhaust gas discharged from a combustion engine 316. The exhaust pipe 312, SCR system 314 and heating system 348 can be structured and function similarly or identically to the exhaust pipe 12, SCR system 14 and heating system 48, respectively, apart from any exceptions described below. Therefore, similar features will not be described again in detail.

Like the SCR system 14, the SCR system 314 may include a reductant tank 318, a reactor system 320 and a storage tank 322. The SCR system 314 may generate and store gas comprising ammonia and provide gas comprising ammonia to the exhaust stream within the exhaust pipe 312. Like the heating systems 48, 148, 248, the heating system 348 may include one or more first heat exchangers 352 in a heat transfer relationship with the reactor system 320.

The first heat exchanger(s) 352 may be in fluid communication with coolant passages in the engine 316 via a coolant supply passageway 356 and a return passageway 357. A pump 358 may circulate working fluid between the first heat exchangers 352 and the engine 316. A control module 346 may be in communication with the pump 358 and may control operation of the pump 358 to start and stop a flow of working fluid through the first heat exchangers 352 and the engine 316. The control module 346 may control the pump 358 based on a temperature of the reactor system 320 and/or fluid within the reactor system 320, for example. Additionally or alternatively, the control module 346 could control the pump 358 based on engine temperature, engine runtime and/or outdoor ambient temperature, for example. Additionally or alternatively, the control module 346 can may activate or deactivate the electrical heating elements 350 at any time to heat the reactor system 320, as desired. In some configurations, the pump 358 may also circulate working fluid through another heat exchanger that heats the reductant tank 318.

With reference to FIG. 4, another exhaust aftertreatment system 410 is provided that may include an exhaust pipe 412, an SCR system 414 and a heating system 448 and may treat exhaust gas discharged from a combustion engine 416. The exhaust pipe 412, SCR system 414 and heating system 448 can be structured and function similarly or identically to the exhaust pipe 12, SCR system 14 and heating system 48, respectively, apart from any exceptions described below. Therefore, similar features will not be described again in detail.

Like the SCR system 14, the SCR system 414 may include a reductant tank 418, a reactor system 420 and a storage tank 422. The SCR system 414 may generate and store gas comprising ammonia and provide gas comprising ammonia to the exhaust stream within the exhaust pipe 412. Like the heating systems 48, 148, 248, 348, the heating system 448 may include one or more first heat exchangers 452 in a heat transfer relationship with the reactor system 420.

The first heat exchanger(s) 452 may be in a heat transfer relationship with waste heat recovery system, such as a Rankine cycle fluid circuit 455. The Rankine cycle fluid circuit 455 may circulate a first working fluid that absorbs heat from exhaust gas discharged from the engine 416. The first heat exchanger(s) 452 may be in fluid communication with a heat exchanger of the Rankine cycle fluid circuit 455 via a supply passage 456 and a return passage 457 such that first heat exchanger(s) 452 receive a second working fluid that absorbs heat from the first working fluid in the heat exchanger of the Rankine cycle fluid circuit 455. It will be appreciated that the first and second working fluids could be the same type or different types of working fluids.

A pump 458 may circulate working fluid between the first heat exchangers 452 and the Rankine cycle fluid circuit 455. A control module 446 may be in communication with the pump 458 and may control operation of the pump 458 to start and stop a flow of working fluid through the first heat exchangers 452. The control module 446 may control the pump 458 based on a temperature of the reactor system 420 and/or fluid within the reactor system 420, for example. Additionally or alternatively, the control module 446 could control the pump 458 based on engine temperature, engine runtime and/or outdoor ambient temperature, for example. Additionally or alternatively, the control module 446 can may activate or deactivate the electrical heating elements 450 at any time to heat the reactor system 420, as desired. In some configurations, the pump 458 may also circulate working fluid through another heat exchanger that heats the reductant tank 418.

In this application, including the definitions below, the term "module" or "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
a reductant tank;
a reactor system receiving reductant from the reductant tank and outputting gas comprising ammonia;
a storage tank receiving gas comprising ammonia from the reactor system and storing a volume of gas comprising ammonia;
a first conduit communicating gas comprising ammonia from the reactor system to a stream of exhaust gas, the first conduit bypassing the storage tank;
a second conduit communicating gas comprising ammonia from the storage tank to the stream of exhaust gas; and
a third conduit communicating gas comprising ammonia from the reactor system to the storage tank, wherein the first and second conduits are fluidly coupled with an exhaust pipe at a location upstream of a catalyst in the stream of exhaust gas, wherein the catalyst is a selective catalytic reduction catalyst, further comprising a particulate filter and an oxidation catalyst, the particulate filter disposed upstream of the location, the oxidation catalyst disposed upstream of the particulate filter.

2. An exhaust aftertreatment system comprising:
a reductant tank;
a reactor system receiving reductant from the reductant tank and outputting gas comprising ammonia;
a storage tank receiving gas comprising ammonia from the reactor system and storing a volume of gas comprising ammonia;
a first conduit communicating gas comprising ammonia from the reactor system to a stream of exhaust gas, the first conduit bypassing the storage tank;
a second conduit communicating gas comprising ammonia from the storage tank to the stream of exhaust gas; and
a third conduit communicating gas comprising ammonia from the reactor system to the storage tank, further comprising a first heat exchanger in a heat transfer relationship with the reactor system, the first heat exchanger transferring heat from exhaust gas to the reactor system.

3. The exhaust aftertreatment system of claim 2, further comprising an exhaust supply passageway fluidly coupling the stream of exhaust gas and the first heat exchanger so that exhaust gas from the stream of exhaust gas can flow through the first heat exchanger.

4. The exhaust aftertreatment system of claim 3, wherein the exhaust supply passageway includes a valve controlling fluid flow therethrough.

5. The exhaust aftertreatment system of claim 4, further comprising an exhaust return passageway fluidly coupling the stream of exhaust gas and the first heat exchanger, wherein the exhaust supply and return passageways are connected to the stream of exhaust gas upstream of a catalyst in the stream of exhaust gas.

6. The exhaust aftertreatment system of claim 5, further comprising an electrical heating element in a heat transfer relationship with the reactor system.

7. The exhaust aftertreatment system of claim 2, further comprising a second heat exchanger in which heat is transferred from the stream of exhaust gas to a working fluid, wherein the first and second heat exchangers are fluidly coupled to each other to allow a first flow of the working fluid therebetween.

8. The exhaust aftertreatment system of claim 7, wherein the second heat exchanger is fluidly coupled to an engine to allow a second flow of the working fluid therebetween.

9. The exhaust aftertreatment system of claim 8, further comprising a valve controlling the first and second flows of the working fluid.

10. The exhaust aftertreatment system of claim 9, further comprising an electrical heating element in a heat transfer relationship with the reactor system.

11. The exhaust aftertreatment system of claim 2, further comprising a Rankine cycle fluid circuit transferring heat from exhaust gas to working fluid, wherein the first heat exchanger receives the working fluid and transfers heat from the working fluid to the reactor system.

12. The exhaust aftertreatment system of claim 2, further comprising:
a second heat exchanger in a heat transfer relationship with the reductant tank, the second heat exchanger transferring heat from exhaust gas to the reductant tank; and
a valve controlling flows of a heat transfer medium through the first and second heat exchangers.

13. An exhaust aftertreatment system comprising:
a reductant tank;
a reactor system receiving reductant from the reductant tank and outputting gas comprising ammonia;
a storage tank receiving gas comprising ammonia from the reactor system and storing a volume of gas comprising ammonia;
a first conduit communicating gas comprising ammonia from the reactor system to a stream of exhaust gas, the first conduit bypassing the storage tank;
a second conduit communicating gas comprising ammonia from the storage tank to the stream of exhaust gas; and a third conduit communicating gas comprising ammonia from the reactor system to the storage tank, further comprising a first heat exchanger in a heat transfer relationship with the reactor system, the first heat exchanger fluidly coupled with an engine to allow communication of a working fluid therebetween, the first heat exchanger transferring heat from the working fluid to the reactor system.

14. An exhaust aftertreatment system comprising:
a reductant tank;
a reactor system receiving reductant from the reductant tank and outputting gas comprising ammonia;
a storage tank receiving gas comprising ammonia from the reactor system and storing a volume of gas comprising ammonia;
a first conduit communicating gas comprising ammonia from the reactor system to a stream of exhaust gas, the first conduit bypassing the storage tank;
a second conduit communicating gas comprising ammonia from the storage tank to the stream of exhaust gas; and
a third conduit communicating gas comprising ammonia from the reactor system to the storage tank, wherein the reactor system includes an electrolysis reactor unit.

15. The exhaust aftertreatment system of claim 14, further comprising a heat exchanger in a heat transfer relationship with the electrolysis reactor unit and another heat exchanger in a heat transfer relationship with the water separator, the heat exchangers transferring heat from exhaust gas to the electrolysis reactor unit and water separator.

16. The exhaust aftertreatment system of claim 14, wherein the reactor system includes and a separation unit disposed downstream of the electrolysis reactor unit.

17. An exhaust aftertreatment system comprising:
a reductant tank;
a reactor system receiving reductant from the reductant tank and providing gas comprising ammonia to an exhaust gas pipe;
a first heat exchanger in a heat transfer relationship with the reactor system, the first heat exchanger transferring heat from exhaust gas to the reactor system;
a second heat exchanger in a heat transfer relationship with the reductant tank, the second heat exchanger transferring heat from exhaust gas to the reductant tank; and
a valve controlling flows of a heat transfer medium through the first and second heat exchangers.

18. The exhaust aftertreatment system of claim 17, further comprising:
a storage tank receiving gas comprising ammonia from the reactor system and storing a volume of the gas;
a first conduit communicating gas comprising ammonia from the reactor system to the exhaust pipe, the first conduit bypassing the storage tank; and
a second conduit communicating gas comprising ammonia from the storage tank to the exhaust pipe, the first and second conduits fluidly coupled with an opening in the exhaust pipe upstream of a catalyst in the exhaust pipe.

19. The exhaust aftertreatment system of claim 18, further comprising a particulate filter and an oxidation catalyst disposed upstream of the opening.

20. The exhaust aftertreatment system of claim 17, further comprising an exhaust gas passageway fluidly coupling the exhaust pipe with the first and second heat exchangers so that exhaust gas from the exhaust pipe can flow through the first and second heat exchangers.

21. The exhaust aftertreatment system of claim 20, further comprising an electrical heating element in a heat transfer relationship with the reactor system.

22. The exhaust aftertreatment system of claim 17, further comprising a third heat exchanger in which heat is transferred from exhaust gas to a working fluid, wherein the first and second heat exchangers are fluidly coupled to the third heat exchanger to allow the working fluid to flow between the first and third heat exchangers and between the second and third heat exchangers.

23. The exhaust aftertreatment system of claim 22, wherein the third heat exchanger is fluidly coupled to an engine to allow the working fluid to flow therebetween.

24. The exhaust aftertreatment system of claim 23, further comprising an electrical heating element in a heat transfer relationship with the reactor system.

25. The exhaust aftertreatment system of claim 17, wherein the reactor system includes an electrolysis reactor unit and a separation unit disposed downstream of the electrolysis reactor unit.

26. A method for treating exhaust gas discharged from a combustion engine, the method comprising:
generating a gas comprising ammonia from a reductant;
storing a first portion of the gas comprising ammonia in a container;
injecting a second portion of the gas comprising ammonia into a stream of exhaust gas, the second portion of the gas comprising ammonia being fluidly isolated from the container; and
injecting gas comprising ammonia from the container into the stream of exhaust gas in response to a cold start of the combustion engine.

27. The method of claim 26, wherein the second portion of the gas comprising ammonia is injected into the stream of exhaust gas through an opening, and wherein gas comprising ammonia from the container is injected into the stream of exhaust gas through the same opening.

28. The method of claim 26, further comprising transferring heat from exhaust gas to a reactor system that generates the gas comprising ammonia.

29. The method of claim 28, wherein the reactor system includes an electrolysis reactor unit and a separation unit.

30. The method of claim 28, further comprising:
providing a first heat exchanger in a heat transfer relationship with the reactor system; and
providing a Rankine cycle fluid circuit transferring heat from exhaust gas to working fluid,
wherein the first heat exchanger receives the working fluid and transfers heat from the working fluid to the reactor system.

31. The method of claim 28, further comprising providing a first heat exchanger in a heat transfer relationship with the reactor system, the first heat exchanger fluidly coupled with the combustion engine to allow communication of a working fluid therebetween, the first heat exchanger transferring heat from the working fluid to the reactor system.

32. The method of claim 28, further comprising providing a first heat exchanger in a heat transfer relationship with the reactor system, wherein transferring heat from exhaust gas to the reactor system includes routing exhaust gas through the first heat exchanger.

33. The method of claim 32, further comprising heating the reactor system with an electrical heating element.

34. The method of claim 28, wherein transferring heat from the exhaust gas to the reactor system includes transferring heat from the exhaust gas to a working fluid and subsequently transferring heat from the working fluid to the reactor system.

35. The method of claim 34, further comprising:
providing a first heat exchanger in a heat transfer relationship with the reactor system; and
providing a second heat exchanger in which heat is transferred from the stream of exhaust gas to the working fluid,
wherein the first and second heat exchangers are fluidly coupled to each other to allow a first flow of the working fluid therebetween.

36. The method of claim 35, wherein the second heat exchanger is fluidly coupled to the combustion engine to allow a second flow of the working fluid therebetween.

37. The method of claim 36, further comprising controlling the first and second flows of the working fluid based on operating parameters of the combustion engine.

38. The method of claim 37, further comprising heating the reactor system with an electrical heating element.

* * * * *